US008350922B2

(12) United States Patent
D'Angelo et al.

(10) Patent No.: US 8,350,922 B2
(45) Date of Patent: Jan. 8, 2013

(54) METHOD TO COMPENSATE THE EFFECT OF THE ROLLING SHUTTER EFFECT

(75) Inventors: Emmanuel Pierre Aimé D'Angelo, Lausanne (CH); Pierre Vandergheynst, Ecublens (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 327 days.

(21) Appl. No.: 12/662,731

(22) Filed: Apr. 30, 2010

(65) Prior Publication Data

US 2011/0267514 A1    Nov. 3, 2011

(51) Int. Cl.
*H04N 5/228* (2006.01)
(52) U.S. Cl. ............... 348/222.1; 348/294; 348/298; 348/302; 348/308
(58) Field of Classification Search .......... 348/294, 348/296, 298, 302, 308, 312; 382/240, 232–233, 382/245, 248, 251
See application file for complete search history.

(56) References Cited

U.S. PATENT DOCUMENTS

2009/0160957 A1* 6/2009 Deng et al. ............... 348/208.99

OTHER PUBLICATIONS

Won-Ho Cho, et al. "A Fast CIS Still Image Stabilization Method without Parallax and Moving Object Problems," IEEE Transactions on Sumer Electronics, vol. 54, No. 2, May 2008, pp. 197-205.
Steven P. Nicklin, et al., "Rolling Shutter Image Compensation," School of Electrical Engineering and Computer Science, The University of Newcastle, Callaghan 2308, Australia, pp. 402-409, 2006.
Li-Wen Chang, et al., "Analysis and Compensation of Rolling Shutter Effect for CMOS Image Sensors," Department of Electrical Engineering, National Taiwan University, Graduate Institute of Communication Engineering, National Taiwan University, 4 pages.
Christopher Geyer, et al, "Geometric Models of Rolling-Shutter Cameras," EECS Department, University of California, Berkeley, pp. 1-8.
Won-Ho Cho, et al., "Affine Motion Based CMOS Distortion Analysis and CMOS Digital Image Stabilization," IEEE Transactions on Consumer Electronics, vol. 53, No. 3, Aug. 2007, pp. 833-841.
Jeong-A Im, et al., "Digital Video Stabilization Algorithm for CMOS Image Sensor," Dept. of E.E. in POSTECH, Pohang, Korea, 2006, pp. 3261-3264.

* cited by examiner

*Primary Examiner* — Yogesh Aggarwal
(74) *Attorney, Agent, or Firm* — Harness, Dickey & Pierce, P.L.C.

(57) ABSTRACT

A method to create a video sequence of a plurality of resultant images is disclosed. The video sequence is produced from images originating from a rolling shutter acquisition sensor.

9 Claims, 3 Drawing Sheets

METHOD TO COMPENSATE THE EFFECT OF THE ROLLING SHUTTER EFFECT

INTRODUCTION

The present invention concerns the field of image acquisition by CMOS sensors and in particular is directed to the correction of the Rolling Shutter effect.

BACKGROUND ART

For several years, the CCD and CMOS technologies have been used to equip the sensor of digital still or animated imagery devices. Initially more performing, the CCD sensors have gradually been supplanted by the CMOS sensors that present a superior quality/price ratio. Nevertheless, the inferior cost of manufacturing of the CMOS sensors can be explained due to technological compromises of which Rolling Shutter is a part and is employed on a wide range of movie cameras, starting from the sensors integrated in the mobile phones to the high end camcorders.

More precisely, today a digital imagery sensor (CCD or CMOS) is made of a 2D arrangement (commonly called matrix) of photosensitive elements (or pixels), usually according to a rectangular grid. Every photosensitive element converts the intensity of the light that it receives into an electric voltage. When a new picture is acquired, it is necessary to read all of these electric voltages and to transfer them, through a bus, towards the processing unit and/or a storage support. This transfer is carried out in a linear manner, that is, pixel by pixel, after having concatenated all the lines that make up the picture.

The behavior of the CCD and CMOS is different during this transfer:

At a precise moment the CCD sensors freeze the values of the voltages for all pixels and store them in a buffer memory. The voltages sent alongside the data bus correspond therefore to the sensor state at a given moment;

Generally the CMOS sensors do not contain any memory buffer. The voltages transmitted alongside the data bus correspond to the state of every pixel at the time of the reception of the sync pulse that is slightly shifted in comparison with its neighbors in order to avoid the collision between two values of different origin on the bus.

This behavior is at the origin of the expression of rolling shutter. In fact, if one supposes that the reading of a line of the picture is almost instantaneous, the final picture is constituted of an assembly of lines measured at slightly different instants. This is equivalent, in terms of pictures obtained, to have a mechanical shutter individually exposing every line and rolling from down to up.

This process is similar to that used on cameras (film and digital) equipped with focal plane shutter to expose sensitive surface for a period less than the time required for vertical displacement of the curtain: the rise of the first curtain (which gives insulation of the film) is almost immediately followed by the rise of the second curtain (which stops the sunlight) so that at every moment light reaches the band located between the 2 curtains of the shutter. This sliding window therefore exposes each strip of film during a specified short time that would have been impossible to achieve if we waited that the first curtain finish its shift before starting the second[1].

[1] One can observe this sliding window if one uses a flash while the speed of closing of the case is superior to its said synchro-X value: the short light of the flash fixes the position of the exposure film at the time of triggering Types of Artifacts Encountered From the description of the process of the rolling shutter, two types of artifacts can be expected:

1. Geometric distortions: if the fixed camera acquires a mobile object, then this object will be moved between the acquisitions of two successive lines of the image. Its appearance will then be deformed: if for example it is a rectangle moving horizontally, each line of the rectangle is slightly shifted versus the previous one to form a parallelogram (see FIG. 1): the time difference at the level of the sensor is translated into a spatial difference from each line of the object observed. This reasoning is obviously valid if the scene is fix and the camera mobile;

2. Brutal differences of radiometry: if the scene contains a flashing lamp (lighthouse at sea, emergency rotating light . . . ) and that this lamp goes off during the acquisition of the scene, then a part of the image has received much lesser light than the other because of the disappearance of this source of light. The integration time of light on each pixel is fixed for the entire image; the exposure calculated including the lighted lamp will immerse a portion of the image in the dark. For example, one portion of the facade of a building is properly shown while another portion will be underexposed and very dark.

Both types of defects are found in practice. When researching on this subject, one finds that the geometric imperfections are sometimes divided into two categories, namely the skew effect and jellocam effect. It is in fact the same phenomenon induced by the rolling shutter, but with a greater or less pronounced degree. The first term refers to the less serious cases, namely geometric defect presented above: a rectangle is transformed into a parallelogram by a shift or shear. The second term refers to more serious cases, which occur when the motion of the camera (for a fixed scene) changes faster than the camera acquires an image. The different parts of the image seem animated with their own movement, as if the observed scene was wobbling, like a jelly dessert. This case occurs relatively frequently when the camera is subjected to vibration of generally high frequency.

State of the Art Solutions

Computer Vision: We can trace the first analysis of the impact of rolling shutter in 2005 [GMS05], accompanied by a modeling of the associated geometric defects and a method to correct them. Just as [NFM06] (which is inspired from the aforementioned), these works of Geyer, Meingast and Sastry fall within the specific context of mobile robotics. The main motivation of the authors is to use simple and low cost sensors (here, web cams connected via Firewire) for odometer tasks and environmental perception of the robot. The rolling shutter indeed disrupts the traditional methods of 3D from the video because it distorts the objects observed during the movements of the robot, thus introducing additional noise in the measures taken from the images.

The authors develop a rigorous geometric modeling of the rolling shutter and the associated optical flow equations to remove the errors induced by the CMOS in the perception calculations. Nevertheless, the proposed methods are used to correct images acquired by the camera only in case of full knowledge of the movement of the camera and the 3D depth of the points observed, which is not practical for generic imaging applications (and is already a strong constraint for the robotics in a controlled environment). Finally, they are also the first to introduce the hypothesis of instantaneous acquisition of a line (i.e. all pixels of the same image line are measured simultaneously and the only time lag is between 2 different lines) which will then be repeatedly used by all other authors.

General public imagers: The interest of researchers for the correction of rolling shutter in consumer applications is also quite limited since only 2 teams have published works on this subject. The first is a South Korean team from POSTECH in 2006 [IKH06] with extended work in [hCH07, CH08]. The purpose of their work is ultimately to correct and stabilize the videos from general purpose sensors rather than measuring positions in 3D. In comparison with [GMS05] they remove the 3D position of the points of the image of parameters to know or to estimate.

Instead, they assume (classic stabilization of videos) that transformation between two successive frames of a video stream can be represented by an affine transformation (6 degrees of freedom) or by a homography (8 degrees of freedom), knowing that proven methods can estimate these changes. They then write about the analytic expression of the transformation chosen with and without rolling shutter (under the hypothesis of instantaneous reading of a line and flat scene, the rolling shutter transforms a homography into another homography) and different types of camera movement (translation, zoom). Then, by identifying words, they separate the apparent motions measured in the images into a component due to rolling shutter and another due to the movement chosen by the operator (traveling, zooming) on which they also carry out calculations of stabilization. Their method is more close to the concerns of an amateur filmmaker than [GMS05] and gives good results for the cases treated. However, the panel of cases processed is limited to simple movements of the camera (translation, zoom) because of the complexity of expressions and calculation inaccuracies.

The second team having published results on the subject of the correction of the effects of rolling shutter in consumer applications is a team in Taiwan [CLC08]. This team does not seem to have known the results obtained by the team POSTECH (the opposite not being true). Although more recent, their approach seems a step backwards because it is less generic than the previous one: it only supports translations as camera movements. Moreover, most of the effort seems to have been put in producing a visually plausible image interpolation process rather than in the skew estimation. The principle of their method is as follows:
1. An optical flow algorithm used to estimate the apparent motion (2D translation) of image blocks;
2. The domain of movements of different blocks is averaged to estimate the translation of the image center, which serves as an estimator of global movement of the scene;
3. The overall movement of the image is regarded as unchanged by the rolling shutter,
4. The camera path over time is obtained by polynomial interpolation (degree 3) between the successive positions of the center of the image;
5. The lines of the image are finally transformed with respect to the interpolated path for the rectified images.

It may be noted also that none of the methods presented in this paragraph is able to handle the case of moving objects within the scene and that all the methods mentioned will have difficulties to handle jellocam cases. Indeed, in this case the global movement of the image is poorly defined and the hypothesis of global rigid motion (even obtained by interpolation) is no longer valid.

It is also interesting to note that:
1. Unlike existing methods, our method of correction of geometric artifacts is theoretically capable of handling both moderate (skew effect) and large (jellocam effect) defects, because there are no hypothesis about the relative movements of the scene and camera. In practice, methods for estimating the rolling shutter with varying degrees of freedom (and therefore more or less robust) can be used depending on the severity of defects we wish to correct;
2. The rolling shutter artifacts have long been known in the case of scanning sensors (of size one or several pixels disposed on a single line), where a sensor is moved in the focal plane of the lens to create the final 2D image. However, parades applied previously are inapplicable here, since they consist in providing heavy rigid supports support to the camera to absorb the vibrations and ... to replace the linear acquisition sensor by a 2D matrix.

BRIEF DESCRIPTION OF THE INVENTION

The purpose of the present application is to propose a method to compensate the effect of the rolling shutter effect. It is then proposed a method to create a video sequence of a plurality of resultant images from images originating from a rolling shutter acquisition sensor, said method comprising the steps of:

acquiring a plurality of images, each image being acquired at a known instant in time for a known possibly varying acquisition duration, all images being of width W and height H when expressed in pixel units, selecting a given image, described hereafter as the current image, with corresponding acquisition start time $t_1$ and acquisition duration $\Delta t_1$, to be processed and a reference image, with corresponding acquisition start time $t_0$ and acquisition duration $\Delta t_0$, said reference image being either a previously acquired image or a subsequent acquired image, decomposing the current and the reference images into blocks and calculating for each block of the current image, of given coordinates $(x_1, y_1)$, the relative motion vector $(u,v)$ from the current image to the reference image, leading to a corresponding block of coordinates $(x_0,y_0)=(x_1+u,y_1+v)$ in the reference image, each block being acquired at a block acquisition time due to the rolling shutter technology, computing for each block of the said reference image the corresponding block acquisition time $t(x_0,y_0)$ given the coordinates $(x_0,y_0)$ of the block in the reference image, the image acquisition start time $t_0$ and the image acquisition duration $\Delta t_0$, using a linear dependence of the block acquisition time on the block position given by the formula $$t(x_0, y_0) = \frac{y_0 \times W + x_0}{W \times H} \Delta t_0 + t_0,$$

computing for each block of the said current image the corresponding block acquisition time $t(x_1,y_1)$ given the coordinates $(x_1,y_1)$ of the block in the current image, the image acquisition start time $t_1$ and the image acquisition duration $\Delta t_1$, using a linear dependence of the block acquisition time on the block position given by the formula $$t(x_1, y_1) = \frac{y_1 \times W + x_1}{W \times H} \Delta t_1 + t_1,$$

selecting a time t*, hereafter reconstruction time and corresponding to the resultant image without rolling shutter effects in the output sequence, recomposing the resultant image, being part of the said video sequence at said reconstruction time t* and corrected from the rolling shutter effect, from the current image by moving each block of the current image in a three dimensional space defined by the image spatial coordinates plus time, the direction of the displacement being given by the line joining the three dimensional position of the block $(x_1, y_1, t(x_1, y_1))$ according to the current image, and its previous three dimensional position $(x_0=x_1+u, y_0=y_1+v, t(x_0, y_0))$ according to the reference image, until it meets the plane of constant time equal to the reconstruction time t* in the said three dimensional space.

BRIEF DESCRIPTION OF THE FIGURES

The invention will be better understood thanks to the attached figures in which.

DETAILED DESCRIPTION

Different methods of correcting the rolling shutter presented above consider only the geometric aspect of image formation, either as a projection of a 3D scene on the 2D surface of the sensor either as a result of 2D-2D transformation between successive frames.

Figure 2:
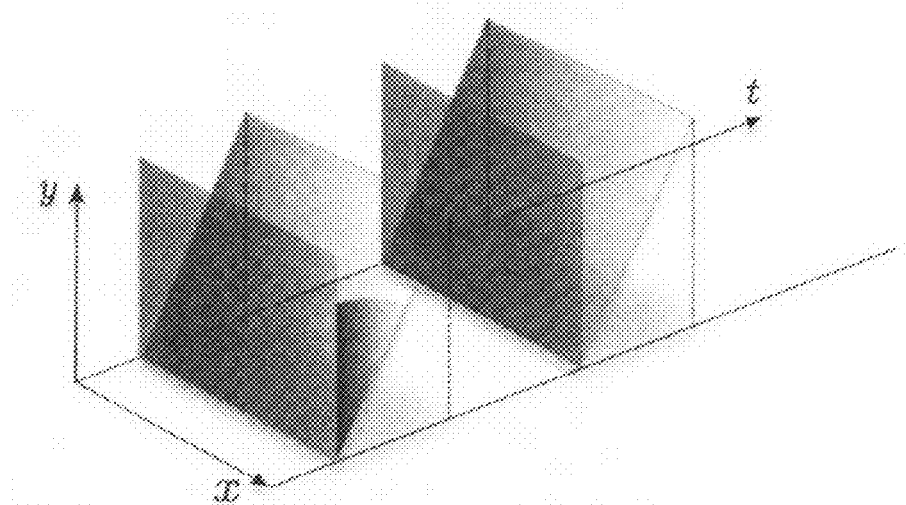
FIG. 2: Rolling shutter distortion in the space-time domain. Tilted planes are measured by rolling shutter devices.

One of the features of the invention is to approach the problem from a different point of view, by considering the available image data in a 3D space where the 3 dimensions are given the 2 dimensions of the images (abscissa and ordinate) plus time. Indeed, capturing a correct image of "CCD" type is equivalent to measure the intensity of light on the sensor plane at a fixed time t: It is therefore a vertical plane in this 3D space abscissa, ordinate, time (x, y, t) (FIG. 2, perpendicular frame).

CMOS imagers, meanwhile, capture a 2D image (x, y) as well, but each line corresponds to different moments in time. These time instants are distributed linearly between the start and the end of the acquisition of an image. Lines acquired by a CMOS sensor are distributed in space (x, y, t) along a tilted plane (FIG. 2 oblique frame). Our method is based on 2D image-to-image computations (like the estimation of a homography or the calculation of optical flow) to estimate the apparent motion of each pixel, then using the additional restriction of belonging to the tilted plane corresponding to an image acquired with rolling shutter to estimate the distortion that is to be compensated. One then reconstructs through simple geometric 3D calculations a vertical image corresponding to the corrected image.

Detailed Calculations

In the following, H is the height (in pixels) of the images taken by the camera and W its width. Pixel indices start at 0 and end at H−1 and W−1 in each direction respectively.

Modeling of Rolling Shutter Suppose we have Two Images:

A reference image I0 corresponding to the scene without distortion, and acquired at a given time interval starting at $t_0$ for a duration $\Delta t_0$;

An image I1 deformed by the rolling shutter with acquisition starting at time $t_1$ for the duration $\Delta t_1$.

Figure 1:
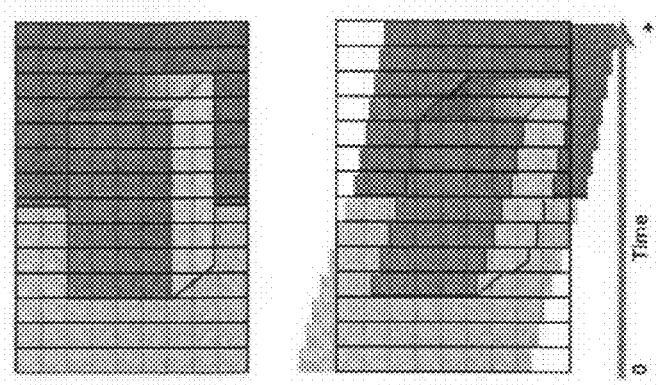
FIG. 1: Example of defects of skew effect type induced by a rolling shutter.

This is illustrated by the FIG. 1 in which an example of defects of skew effect type induced by a rolling shutter is shown. The camera moves horizontally from left to right, and the superimposed grid is the pixel grid.

The acquisition of the image I1 (on the right in FIG. 1) starts with the first line. The next line is acquired while the camera continues to move, resulting in a mismatch with the first line, and so on till the top of the image. The induced distortion is invisible on non-textured parts (foreground, sky). It is characteristic on the building: its vertical lines are now oblique.

Next, consider a given block P0 of I0 whose coordinates are (x0, y0, $t(x_0, y_0)$). The relative motion of the scene and the camera transforms P0 into P1 in I1 with coordinates (x1, y1, t $(x_1, y_1)$). x1 and y1 are known by a first algorithm: for example, in the case of computing optical flow, x0=x1+u and y0=y1+v.

The translation in equations of our intuition is as follows: in the case a sensor with rolling shutter, t $(x_1, y_1)$ is not equal to the start of the acquisition of image I1. In other words, the vector joining P0 and P1 in the space-time volume considered is:

$$P_0 P_1 = \begin{pmatrix} x_1 - x_0 \\ y_1 - y_0 \\ t(x_1, y_1) - t(x_0, y_0) \end{pmatrix}$$

and not:

$$P_0 P_1 = \begin{pmatrix} x_1 - x_0 \\ y_1 - y_0 \\ t_1 - t_0 = \frac{1}{framerate} \end{pmatrix}$$

as in the case of CCD imagers.

To compensate the effects of rolling shutter becomes forming an image I* corresponding to a moment t* constant throughout the image.

Selection of the reconstruction time t*. Basically, the reconstruction time r can be selected arbitrarily. However, to obtain a better result, the reconstruction time t* should be selected according the following:

in the case of the reference image is a previous acquired image: between the end of the acquisition of the current image and the end of the acquisition of the reference image, in the case of the reference image is a subsequent acquired image: between the beginning of the acquisition of the reference image and the beginning of the acquisition of the current image.

Hypothesis for instant line. We endorse the classical hypothesis of instant acquisition of each line, that is to say that all pixels belonging to the same line of the observed image' correspond to a same moment t(line). In addition, the electronic control sensor in the device spans the collection of the times t(line) linearly between all the lines of the image starting at the bottom, hence:

$$t(x_0, y_0) = t(y_0) = y_0 \frac{\Delta t_0}{H-1} + t_0$$

and $$t(x_1, y_1) = t(y_1) = y_1 \frac{\Delta t_1}{H-1} + t_1$$

Without the hypothesis of immediacy, all calculations presented are valid, and one must then replace the formula giving the time by:

$$t(x, y) = \frac{y \times W + x}{(W-1)(H-1)} \Delta t + t_{start}$$

for an image of size W×H pixels (width×height) of coordinates belonging to [0, W−1]×[0, H−1].

Construction of the Corrected Image

Suppose now that we want to reconstruct the image corresponding to the time t*. We introduce then a further hypothesis: we assume that the block P0 moved in a straight line between the images I0 and I1 to arrive at block P1; We can then reconstruct the image corrected I* corresponding to t*: it simply corresponds to the intersection between all vectors P0P1 and the vertical plane defined by t=t*.

Note that in fact, the acquisition starts at the top of the sensor, but the optics reverses the image. Hence, the scanning does begin at the bottom of the recorded image This intersection is obtained by simple calculations of 3D geometry:
1. We construct the matrix of Plücker L corresponding to the straight line (P0P1);
2. The intersection between the straight line (PP) and the vertical plane Π of normal vector $(0,0,1)^T$ corresponding to t=t* is given by the result of the multiplication $L\Pi_t$.

The detail of the calculations of a line-plane intersection in 3D is given at the end of the present section.

Finally, for each pixel P1 of the deformed image I1, this procedure allows us to obtain its coordinates in the corrected image I* without rolling shutter effect.

Calculation of the Intersection Between a Straight Line and a 3D Plan

Consider 2 points P0=($x_0, y_0, t(x_0, y_0)$) and P1=($x_1, y_1, t(x_1, y_1)$). The line (P0P1) joining them can be expressed as a matrix of Plücker L as per the following calculation done in projective coordinates:

$$L = \begin{pmatrix} x_0 \\ y_0 \\ t(x_0, y_0) \\ 1 \end{pmatrix} \begin{pmatrix} x_1 & y_1 & t(x_1, y_1) & 1 \end{pmatrix} - \begin{pmatrix} x_1 \\ y_1 \\ t(x_1, y_1) \\ 1 \end{pmatrix} \begin{pmatrix} x_0 & y_0 & t(x_0, y_0) & 1 \end{pmatrix}$$

$$L = \begin{pmatrix} 0 & x_0 y_1 - y_0 x_1 & x_0 t(x_1, y_1) - t(x_0, y_0) x_1 & x_0 - x_1 \\ x_1 y_0 - y_1 x_0 & 0 & y_0 t(x_1, y_1) - t(x_0, y_0) y_1 & y_0 - y_1 \\ x_1 t(x_0, y_0) - t(x_1, y_1) x_0 & y_1 t(x_0, y_0) - t(x_1, y_1) y_0 & 0 & t(x_0, y_0) - t(x_1, y_1) \\ x_1 - x_0 & y_1 - y_0 & t(x_1, y_1) - t(x_0, y_0) & 0 \end{pmatrix}$$

The vertical plane corresponding to the time T=constant is parameterized by the vector $\Pi_T = (0, 0, 1, -T)$. The intersection between the line (P0P1) and the plane defined by $\Pi_T$ is given by $L\Pi_T$. We then obtain:

$$L\prod_T = \begin{pmatrix} 0 & x_0 y_1 - y_1 x_0 & x_0 t(x_1, y_1) - t(x_0, y_0) x_1 & x_1 - x_0 \\ x_1 y_0 - y_0 x_1 & 0 & y_0 t(x_1, y_1) - t(x_0, y_0) y_1 & y_0 - y_1 \\ x_1 t(x_0, y_0) - t(x_1, y_1) x_0 & y_1 t(x_0, y_0) - t(x_1, y_1) y_0 & 0 & -t(x_1, y_1) + t(x_0, y_0) \\ x_1 - x_0 & y_1 - y_0 & t(x_1, y_1) - t(x_0, y_0) & 0 \end{pmatrix} \begin{pmatrix} 0 \\ 0 \\ 1 \\ -T \end{pmatrix}$$

$$L\prod_T = \begin{pmatrix} \frac{(x_0 t(x_1, y_1) - t(x_0, y_0) x_1) - T(x_0 - x_1)}{t' - t} \\ \frac{(y_0 t(x_1, y_1) - t(x_0, y_0) y_1) - T(y_0 - y_1)}{t(x_1, y_1) - t(x_0, y_0)} \\ T \\ 1 \end{pmatrix}$$

using the projective coordinate definition.

The calculation done here is completely general: it is valid between 2 different images of an uncorrected video (defined by their coordinates $t(x_0,y_0), t(x_1,y_1)$ as long as the hypothesis of uniform rectilinear motion (possibly independent) for each pixel holds. There is no need for the hypothesis of instant line if one is able to also calculate accurately the times t and t' without it.

Important Notes The calculations presented in this report are completely generic, requiring only the hypothesis of uniform straight motion for each pixel of an image. This is true most of the time given the very short durations considered (video sequences usually have a framerate of 10 to 30 images per second). For example, we can:

- Correct sequences containing moving objects: provided that the association (P0, P1) is reliable, the correction made to each pixel is independent of that made to the other pixels surrounding it, hence allowing for different corrections when different motions are encountered in a single image;
- Correct sequences that do not meet the hypothesis of instantaneous acquisition for each line: it is sufficient to know the function associating the image coordinates (x, y) the time coordinate t, but the latter need not be obtained by equation 3 (it is simply the most common case).

Strong rolling shutter cases ("jellocam" effect) can be corrected using the equations provided. In this specific case, the main difficulty lies in the evaluation of the point associations (P0, P1).

If it is possible to express the data mapping between P0 and P1 by an homography H (i.e. P0=HP1), then we find a method similar to that described in the prior art but we are not limited anymore to translation movements and zooming at the level of the camera. If the data mapping is given by computing the optical flow, then we are able to correct the effects of jellocam that cannot be taken into account by the methods based on rigid transformations such as homographies.

Description of the Reconstruction Method

When a rolling shutter camera is used, individual frames are tilted in the space-time domain, while they are perpendicular to the time axis for global shutter and CCD cameras (see FIG. 2).

Figure 3:
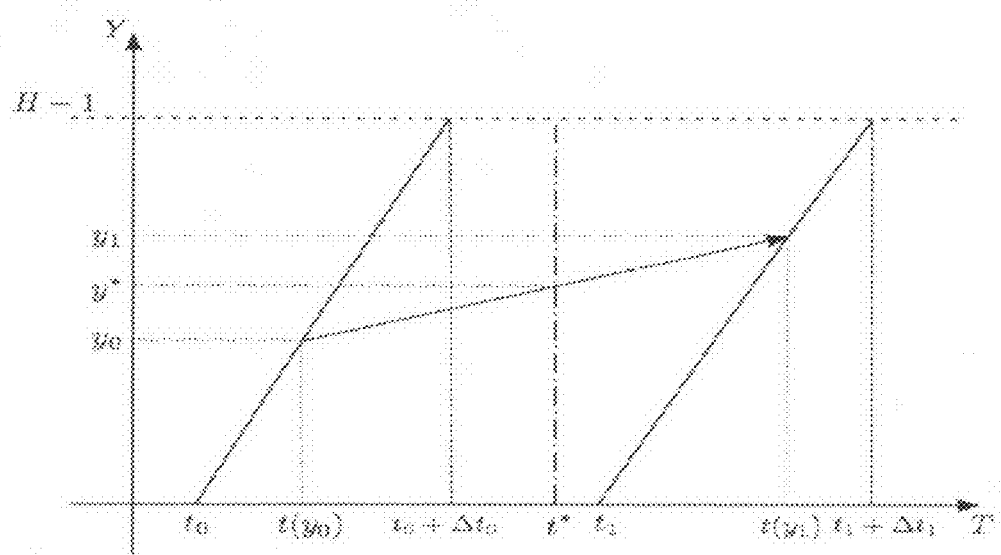
FIG. 3: Geometric coordinates used to compute the resultant image from images distorted by a rolling shutter.

The acquisition of the reference image starts at time $t_0$ for a duration of $\Delta t_0$ seconds. The acquisition of the current image starts at time $t_1$ and lasts $\Delta t_1$ seconds. Both images have dimensions H by W pixels, where H is the height and W the width of the image respectively. Furthermore, image coordinates start at 0, hence the last row of the image is at the vertical coordinate H−1 (FIG. 3). For this drawing we have chosen a reference frame anterior to the current image, but the converse is also possible and does not change the computations since all the computations involve the signed difference between each time, and not the actual time values.

Each block of the reference image is associated with its spatial coordinates $(x_0, y_0)$ in the reference image and its motion vector (u, v). Using these notations, the block has then the coordinates $(x_1, y_1)$ $(x_0+u, y_0+v)$ in the current image by definition of the motion vector. The positions of the block are augmented to also include the acquisition time of the time and become $(x_0, y_0, t(y_0))$ and $(x_1, y_1, t(y_1))$ in the reference and current image respectively (see FIG. 3).

We make the hypothesis that all lines are sampled regularly during an image acquisition, and that the reading of a line is almost instantaneous. Under these assumptions, one can compute:

$$t(x_0, y_0) = t(y_0) = y_0 \frac{\Delta t_0}{H-1} + t_0 \text{ and } t(x_1, y_1) = t(y_1) = y_1 \frac{\Delta t_1}{H-1} + t_1$$

We then consider the selected reconstruction time and give the formula to infer the resultant image from the reference and current image. We make the assumption that the light ray trajectories are straight lines. Hence, for each block, its position in the resultant image is given by the intersection of the plane of constant time t* and its trajectory. Using Plücker matrices and homogeneous coordinates to represent the block trajectory and this plane, the coordinates of the given block in the resultant image are given by the following matrix product:

$$\begin{pmatrix} 0 & x_0 y_1 - y_0 x_1 & x_0 t(y_1) - t(y_0) x_1 & x_0 - x_1 \\ y_0 x_1 - x_0 y_1 & 0 & y_0 t(y_1) - t(y_0) y_1 & y_0 - y_1 \\ x_1 t(y_0) - t(y_1) x_0 & y_1 t(y_0) - t(y_1) y_0 & 0 & t(y_0) - t(y_1) \\ x_1 - x_0 & y_1 - y_0 & t(y_1) - t(y_0) & 0 \end{pmatrix} \begin{pmatrix} 0 \\ 0 \\ 1 \\ -t^* \end{pmatrix}$$

Finally, by calculating this product and then inverting the homogeneous coordinates, the position of the given block in the resultant image coordinate system are:

$$\frac{1}{t(y_1) - t(y_0)} (x_0(t(y_1) - t^*) - x_1(t(y_0) - t^*))$$

for the horizontal and $$\frac{1}{t(y_1) - t(y_0)} (y_0(t(y_1) - t^*) - y_1(t(y_0) - t^*))$$

for the vertical coordinate.

Note that we never make the assumption that the reference time had to be anterior to the correction time, nor did we make the assumption that the two frames I0 and I1 were consecutive. Actually, all the derived calculations rely on the signed difference between the different times. Hence, actual values are not used and the presented results are generic.

Figure 4:
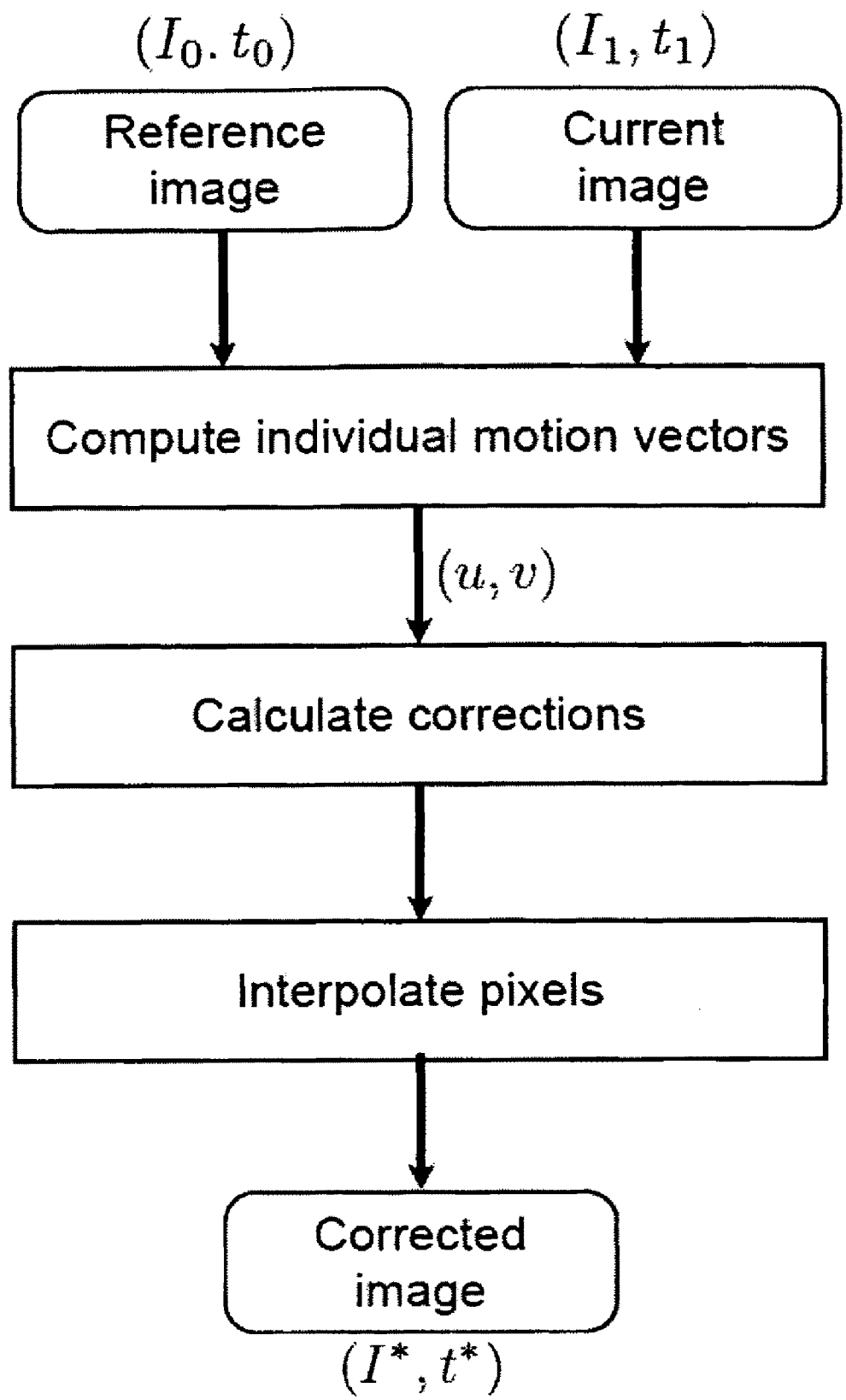
FIG. 4: This diagram summarizes the process of producing a corrected image belonging to the resultant video sequence.

The diagram of the FIG. 4 summarizes the process of producing a corrected image belonging to the resultant video sequence.

The corrected image creation process is given 2 images acquired by a rolling shutter CMOS imaging sensor, along with the times and duration used to acquire the images. One of the images is a reference image, the other is the current image that will be transformed to produce the corrected image. For each block of the current image the corresponding block inside the reference image is found, hence computing a motion vector for each block of the current image. This motion vector, along with the current and reference block position and the times and duration associated with the two images are used to compute the amount and direction of the correction that should be applied to the current block. Finally, given all the individual block positions, a corrected image is formed.

This corrected image is similar to an image acquired by a CCD imaging sensor, i.e. it corresponds to a single time t* and is not affected by the rolling shutter technology.

Figure 5:
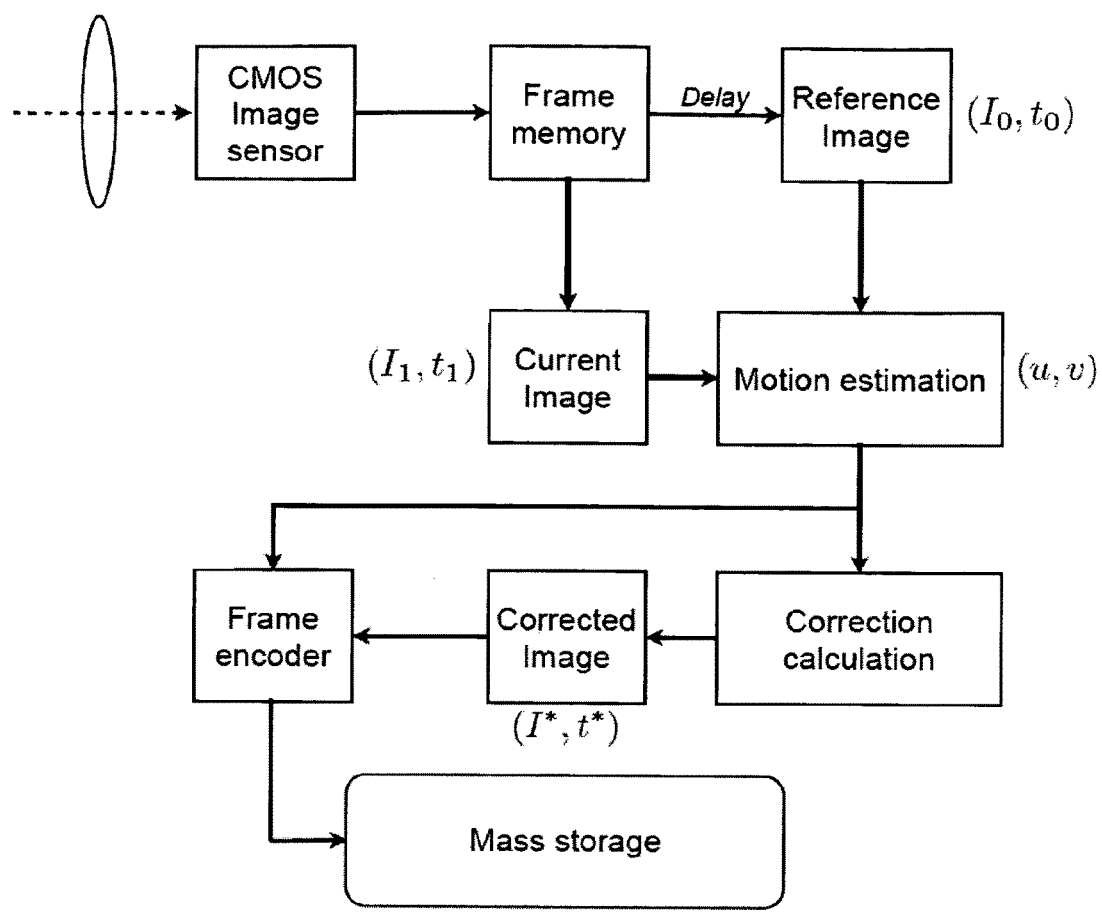
FIG. 5: This diagram describes the application of the proposed invention inside an imaging device such as an hand held camera.

The diagram of the FIG. 5 describes the application of the proposed invention inside an imaging device such as an hand held camera.

Rays of light go through a lens and are measured using a CMOS rolling shutter imaging sensor. Pixels values are stored in frame memory. The device keeps in memory two images, namely the reference image and the current image, corresponding to two different periods in time, along with the acquisition start time and acquisition duration used. Then, a dedicated module computes for each block of the current image the corresponding block in the reference image, hence computing a two dimensional motion vector for each block of the current image. This motion information is used, along with the acquisition start time and acquisition duration associated with each image to compute the corrections required to remove the rolling shutter effects. Then, a CCD-like image, namely the corrected image, is computed after gathering the corrected positions for each block of the current image. This corrected image corresponds to a single time instant, as if it was acquired using a CCD imaging sensor. This corrected image is transferred to a frame encoding module to transform it into a format more suitable for digital storage, and finally written to a digital mass media. The frame encoder does not need to recompute the block motions since they have been computed beforehand. Hence, the motion estimator module can be shared by the frame correction and frame encoding processes.

Industrial Applications of the Invention

The correction method of geometric artifacts of rolling shutter proposed is generic and independent of the targeted application. Consequently, the proposed method is suitable for any product that has to process the videos taken by a CMOS sensor. As these sensors become common even for high-end cameras, the concerned imagers are very varied. The method will be implemented into the processor of these cameras in order to produce the video sequence.

Most of the computing time is actually devoted to the calculation of pixel to pixel correspondence. But methods for estimating these real-time already exist. One can imagine, for example, operate the computation of optical flow directed to the MPEG compression of a camera, or well add a point detector of quick interest. Thus, applications integrated within the cameras (e.g. webcam, or by dedicated hardware in a camcorder) are easily possible for our correction system.

References

[CH08] Won-Ho Cho and Ki-Sang Hong. A fast cis still image stabilization method without parallax and moving object problems. Consumer Electronics, IEEE Transactions on, 54 (2):197-205 May 2008.

[CLC08] Li-Wen Chang, Chiayi-Kai Liang, and Horner H. Chen. Analysis and compensation of rolling shutter effect. *IEEE Transactions on Image Processing*, 17 (8): 1323-1330, August 2008.

[GMS05] Christoph Geyer, Marci Meingast, and Shankar Sastry. Geometric models of rolling-shutter cameras. In *6th Int. workshop on Omnidirectional Vision, Camera Networks and Non-classical cameras*, 2005.

[hCH07] Won Ho Cho and Ki-Sang Hong. Affine Motion Based CMOS distortion analysis and CMOS digital image stabilization. *Consumer Electronics, IEEE Transactions on*, 53 (3):833-841, August 2007.

[IKH06] Jeong-A Im, Dae-Woong Kim and Ki-Sang Hong. Digital Video Stabilization Algorithm for cmos image sensor. In *IEEE Proc. Int'l Conf. on Image Processing*, 2006.

[NFM06] Steven P. Nicklin, Robin D. Fisher, and Richard H. Middleton. Rolling shutter image compensation. In *Robo Cup* 2006: *Robot Soccer World Cup X*, pages 402-409, 2006.

The invention claimed is:

1. Method to create a video sequence of a plurality of resultant images from images originating from a rolling shutter acquisition sensor, said method comprising the steps of:

acquiring a plurality of images, each image being acquired at a known instant in time for a known possibly varying acquisition duration, all images being of width W and height H when expressed in pixel units, selecting a given image, described hereafter as the current image, with corresponding acquisition start time $t_1$ and acquisition duration $\Delta t_1$, to be processed and a reference image, with corresponding acquisition start time $t_0$ and acquisition duration $\Delta t_0$, said reference image being either a previously acquired image or a subsequent acquired image, decomposing the current and the reference images into blocks and calculating for each block of the current image, of given coordinates $(x_1,y_1)$, the relative motion vector $(u,v)$ from the current image to the reference image, leading to a corresponding block of coordinates $(x_0,y_0)=(x_1+u,y_1+v)$ in the reference image, each block being acquired at a block acquisition time due to the rolling shutter technology, computing for each block of the said reference image the corresponding block acquisition time $t(x_0,y_0)$ given the coordinates $(x_0,y_0)$ of the block in the reference image, the image acquisition start time $t_0$ and the image acquisition duration $\Delta t_0$, using a linear dependence of the block acquisition time on the block position given by the formula $$t(x_0, y_0) = \frac{y_0 \times W + x_0}{W \times H}\Delta t_0 + t_0,$$

computing for each block of the said current image the corresponding block acquisition time $t(x_1,y_1)$ given the coordinates $(x_1,y_1)$ of the block in the current image, the image acquisition start time $t_1$ and the image acquisition duration $\Delta t_1$, using a linear dependence of the block acquisition time on the block position given by the formula $$t(x_1, y_1) = \frac{y_1 \times W + x_1}{W \times H}\Delta t_1 + t_1,$$

selecting a time t*, hereafter reconstruction time and corresponding to the resultant image without rolling shutter effects in the output sequence, recomposing the resultant image, being part of the said video sequence at said reconstruction time t* and corrected from the rolling shutter effect, from the current image by moving each block of the current image in a three dimensional space defined by the image spatial coordinates plus time, the direction of the displacement being given by the line joining the three dimensional position of the block $(x_1,y_1,t(x_1,y_1))$ according to the current image and its previous three dimensional position $(x_0=x_1+u,y_0=y_1+v,t(x_0,y_0))$ according to the reference image, until it meets the plane of constant time equal to the reconstruction time t* in the said three dimensional space.

2. The method of claim 1, wherein the reconstruction time t* is located, in the case of the reference image is a previous acquired image: between the end of the acquisition of the current image and the end of the acquisition of the reference image, in the case of the reference image is a subsequent acquired image: between the beginning of the acquisition of the reference image and the beginning of the acquisition of the current image.

3. The method of claim 1, wherein the block has a size of one pixel of the acquired image.

4. The method of claim 1, wherein the block acquisition time depends on its vertical coordinate:

$$t(x_0, y_0) = t(y_0) = y_0 \frac{\Delta t_0}{H-1} + t_0$$

in the said reference image and $$t(x_1, y_1) = t(y_1) = y_1 \frac{\Delta t_1}{H-1} + t_1$$

in the said current image.

5. The method of claim 1, wherein it comprises the step of:
calculating a global geometric transform calculated between the current and the reference images so as to obtain a motion vector field parameterized by said geometric transform,
extracting from the motion vector field the motion vector corresponding to each block.

6. The method of claim 1, wherein the acquisition device acquire a block and deliver its corresponding block acquisition time.

7. The method of claim 1, wherein the acquisition of the subsequent image starts when the last block of the current image is acquired.

8. The method of claim 1, wherein the acquisition of the subsequent image starts after a lap time following the acquisition of the last block of the current image.

9. Image acquisition device to create a video sequence of a plurality of images, the image acquisition device comprising:
a sensor configured to acquire a plurality of images, the plurality of images being acquired at a time instant for an acquisition duration; and
a processing device configured to,
select a current image to be processed, the current image having an acquisition start time $t_1$, and an acquisition duration $\Delta t_1$,
select a reference image, the reference imaging having an acquisition start time $t_0$ and an acquisition duration $\Delta t_0$, the reference image being acquired one of previously to the current image and subsequently to the current image,
decompose the current image and the reference image into blocks, generate, for each block of the current image with coordinates $(x_1,y_1)$, a relative motion vector $(u,v)$ from the current image to a previous or subsequent reference image, each block being acquired at a block acquisition time,
generate a corresponding block of coordinates $(x_0,y_0)=(x_1+u,y_1+v)$ in the reference image based on the generated relative motion vector,
generate, for each block of the reference image, the corresponding block acquisition time $t(x_0,y_0)$ based on based on a linear dependence of the block acquisition time on the block position, the linear dependence given by $$t(x_0, y_0) = \frac{y_0 \times W + x_0}{W \times H} \Delta t_0 + t_0$$

where $t_0$ is the image acquisition start time of the reference image,
$\Delta t_0$, is the image acquisition duration of the reference image,
$(x_0,y_0)$ are coordinates of the block in the reference image,
W is the width in pixels of the reference image, and
H is the height in pixels of the reference image,
generate, for each block of the current image, the corresponding block acquisition time $t(x_1,y_1)$ based on a linear dependence of the block acquisition time on the block position, the linear dependence given by $$t(x_1, y_1) = \frac{y_1 \times W + x_1}{W \times H} \Delta t_1 + t_1,$$

where $t_1$ is the image acquisition start time of the current image,
$\Delta t_1$, is the image acquisition duration of the current image,
coordinates $(x_1,y_1)$ are coordinates of the block in the current image,
W is the width in pixels of the current image, and
H is the height in pixels of the current image,
select a reconstruction time corresponding to the resultant image without rolling shutter effects in the output sequence, and
recompose a resultant image of the video sequence at the reconstruction time t*, the resultant image corrected relative to the current image by moving each block of the current image in a three dimensional space defined by the image spatial coordinates plus time, the direction of the displacement of the resultant image relative to the current image being given by a line joining the three dimensional position of the block $(x_1,y_1,t(x_1,y_1))$ according to the current image and the previous three dimensional position $(x_0=x_1+u,y_0=y_1+v,t(x_0,y_0))$ of the current image according to the reference image, until the resultant image meets a plane of constant time equal to the reconstruction time t* in the three dimensional space.

* * * * *